United States Patent [19]

Gold

[11] Patent Number: 4,588,149
[45] Date of Patent: May 13, 1986

[54] LOWERED OPENING SHOCK PARACHUTE CANOPY

[75] Inventor: David Gold, Ridgecrest, Calif.

[73] Assignee: The United States of America as represented by the Secretary of the Navy, Washington, D.C.

[21] Appl. No.: 652,548

[22] Filed: Sep. 20, 1984

[51] Int. Cl.$^4$ .............................................. B64D 17/18
[52] U.S. Cl. .................................................. 244/145
[58] Field of Search ............ 244/145, 142, 152, 138 R

[56] References Cited

U.S. PATENT DOCUMENTS

| | | | |
|---|---|---|---|
| 1,511,154 | 10/1924 | Ball | 244/145 |
| 3,099,426 | 7/1963 | Lemoigne | 244/145 |
| 3,284,032 | 11/1966 | Eckstrom | 244/145 |
| 3,393,885 | 7/1968 | Neumark | 244/145 |
| 3,612,449 | 10/1971 | Sepp | 244/145 |
| 4,013,248 | 3/1977 | Kalabukhova et al. | 244/145 |
| 4,098,475 | 7/1978 | Heinrich | 244/152 |

FOREIGN PATENT DOCUMENTS

| | | | |
|---|---|---|---|
| 44572 | 3/1935 | France | 244/145 |
| 1056062 | 2/1954 | France | 244/145 |
| 1165812 | 10/1958 | France | 244/145 |

Primary Examiner—Trygve M. Blix
Assistant Examiner—Rodney Corl
Attorney, Agent, or Firm—Robert F. Beers; W. Thom Skeer

[57] ABSTRACT

A controlled opening shock parachute is made by dividing each gore of a circular parachute into two panels, an upper and a lower. The adjoining edges of the panels are of different lengths and left unjoined so an uneven slit is formed. During the parachute's opening sequence, air flows into the slits to open the upper panels. After the upper panels are inflated, air flows out of the slits as the lower panels open.

4 Claims, 13 Drawing Figures

LOWERED OPENING SHOCK PARACHUTE CANOPY

BACKGROUND OF THE INVENTION

1. Field of the Invention

This invention pertains to parachutes. In particular, this invention relates to parachutes which have reduced opening shock.

2. Description of the Prior Art

One of the most critical times during a parachute descent is when the parachute fills with air. The large increase in drag and the resultant rapid deceleration as the canopy opens causes a sharp jolt. The person or equipment descending via parachute can be harmed by this jolt if the opening shock is too high. Aircraft performance is constantly being improved and one of the main areas of improved performance is increased speed. Ejection at high speeds increases the opening force on the parachutist. Parachutes designed for performance at high airspeed required the sacrifice of high reliability at lower airspeeds. A single parachute that imparts significantly lower opening shock loads to the user at high airspeeds and also has acceptable performance at low airspeed is a major challenge to a designer. Prior designs have have used complex geometric patterns to lessen opening shock, and some designs rely on a complexity of ancillary devices. These devices include sliding lines, rings, and slots made by removing an entire panel of gore.

SUMMARY OF THE INVENTION

A circular parachute has each gore divided into two panels, an upper and a lower. The adjoining division edges of the panels are of different lengths, the lower panel having a longer edge. The panel edges are fastened at the ends only, leaving an uneven slit between the two panels. During opening, air enters through the slits helping to fill the upper panels first. After the upper panels, which form the canopy's crown have opened, the lower panels, which form the canopy's skirt, open with air filling the parachute in the normal manner, but with exiting through the uneven slits.

DESCRIPTION OF THE INVENTION

Figure 1A:
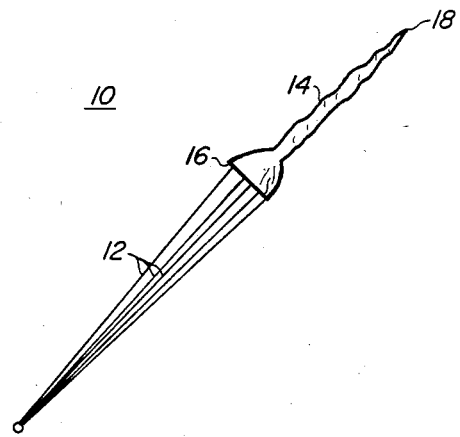
FIGS. 1A–1F show the opening sequence of a prior art circular parachute.
Figure 1B:
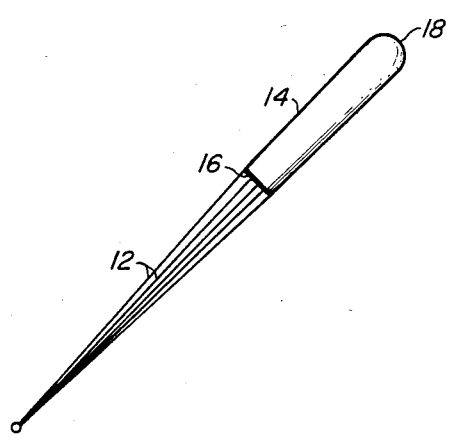

This invention is best understood if it is compared to the normal opening sequence, FIG. 1A to FIG. 1F, of prior art circular parachutes. The opening process starts from the moment that the complete parachute 10 which has lines 12 and canopy 14, has been deployed from the pack or bag, not shown, that held the folded parachute. This event is called "line-stretch". The first stage of the opening sequence is shown in FIG. 1A and occurs after line-stretch. Canopy 14 of parachute 10 starts to trap air when suspension lines 12 become taut. The first trapped air is a small ball of air trapped by the skirt 16 of canopy 14. The ball of air spreads skirt 16. In FIG. 1B, the ball of air spreads canopy 14 until it reaches the uppermost peak, the crown area 18. Canopy 14 now takes on a "squid appearing" shape.

Figure 1C:
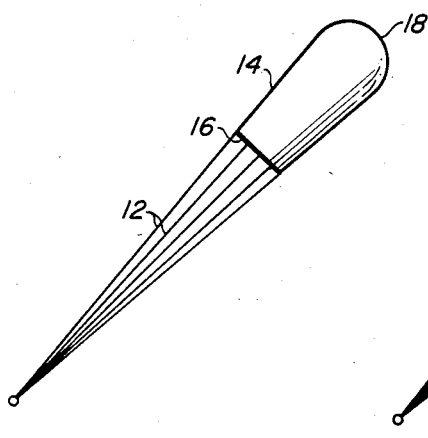

In FIG. 1C, the ball of air in crown area 18 starts to grow as canopy 14 continues to trap air. The maximum opening shock occurs at this stage. Time wise, the time to go from the release of the parachute, then from FIG. 1A to FIG. 1B is significantly greater than the time to go from FIG. 1B to FIG. 1C. The brevity of the transition time to the FIG. 1C configuration is described by canopy 10 being thought of as "popping open" at this stage. The quick popping open causes a great change in the aerodynamic cross section of parachute 10. This abrupt increase in drag and resultant deceleration produces the opening shock.

Figure 1D:
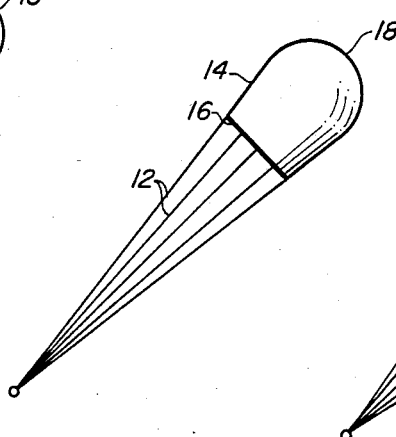

FIG. 1D shows the continued squid-appearance as canopy 14 grows from further filling. This growth is relatively slow and uniform. After this initial opening, parachute 10 fills at a relatively slow rate with the result that a parachutist produces a reasonably uniform deceleration after the opening shock.

Figure 1E:
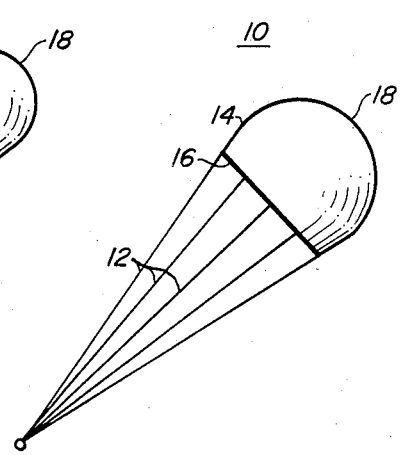
Figure 1F:
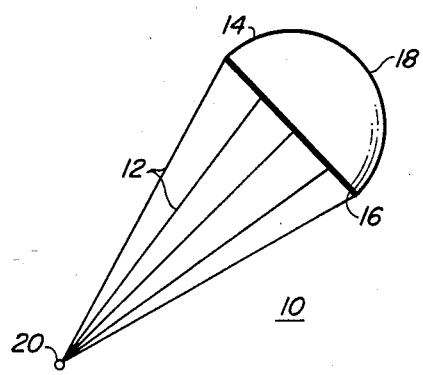

In FIG. 1E, parachute 10 starts to assume a characteristic inverted-saucer or bowl shape as canopy 14 continues to trap more air. When canopy 14 is fully open. FIG. 1F, the load at confluence point 20 assumes a uniform terminal descent velocity.

Figure 2:
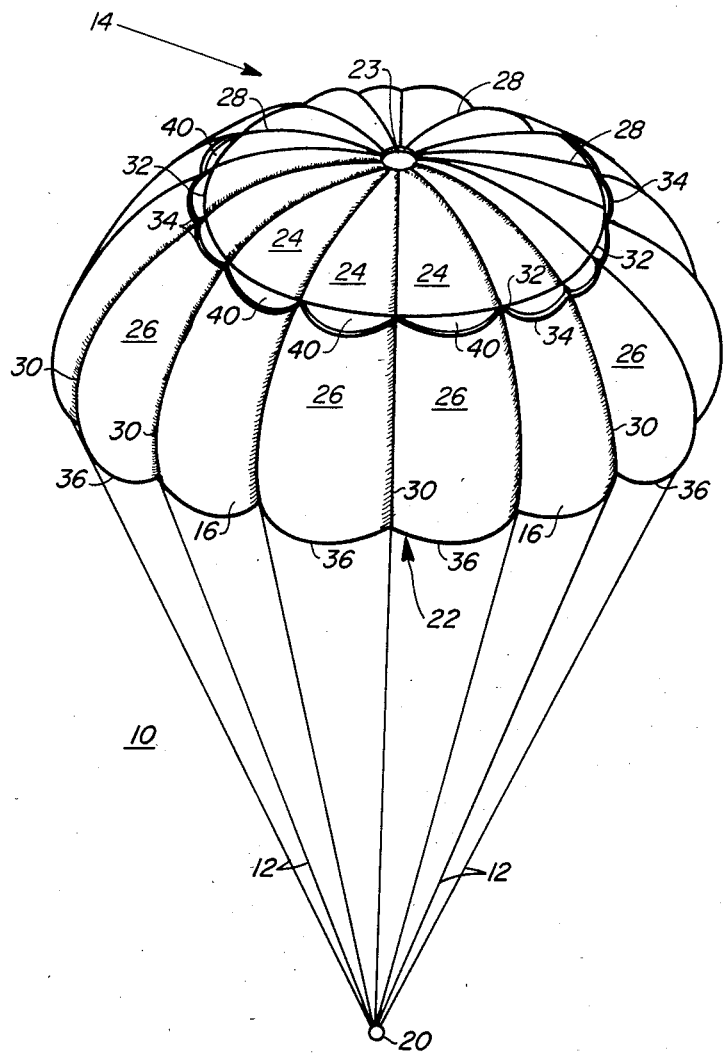
FIG. 2 shows the present invention during descent.

In FIG. 2, the present invention is shown fully open in terminal descent. Suspension lines 12 are attached to skirt 16 of canopy 14. Canopy 14 is normally composes of panels of gore 22. In prior art parachutes, each panel of gore is stitched to two adjacent panels until a closed pattern is completed for a circular parachute. An apex opening 23 is connectional in the parachute arts.

Figure 3:
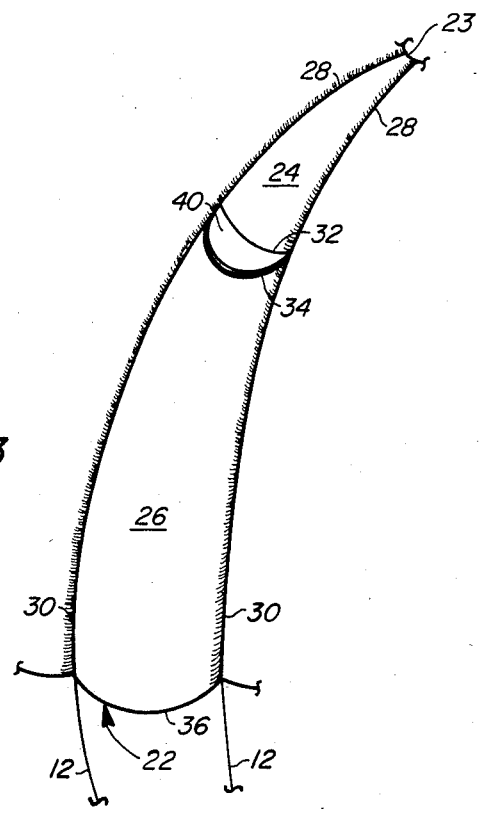
FIG. 3 shows a single gore of the present invention.

As shown in FIG. 2, each gore 22 is composed of two panels of material, an upper panel 24 and a lower panel 26. Each panel may have more than one section. The panel material may be nylon or any suitable parachute material. A single gore 22 is shown in FIG. 3. Each gore 22 has an upper panel 24 bounded by sides 28 and a lower panel 26 bounded by sides 30. Upper panel 24 has a base hem 32 and lower panel 26 is bounded on top by hem 34 and on bottom by hem 36. The dimension of hem 32 is significantly shorter than the length of hem 34. Hems 32 and 34 are not joined together except at their ends. This difference in length causes a pronounced fullness to the slit 40 formed between hems 32 and 34.

Figure 4A:
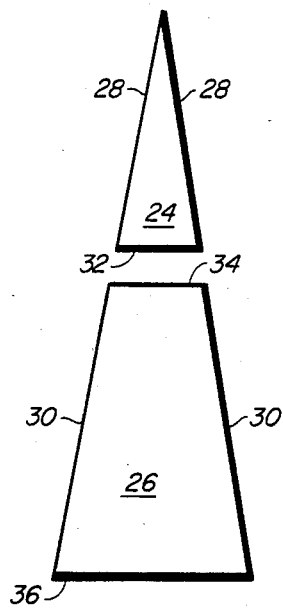
FIGS. 4A, 4B, and 4C show various gore patterns that may be used to make the present invention.
Figure 4B:
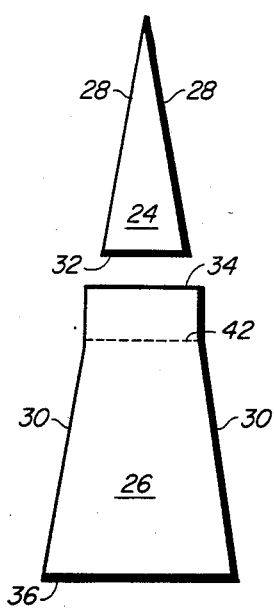
Figure 4C:
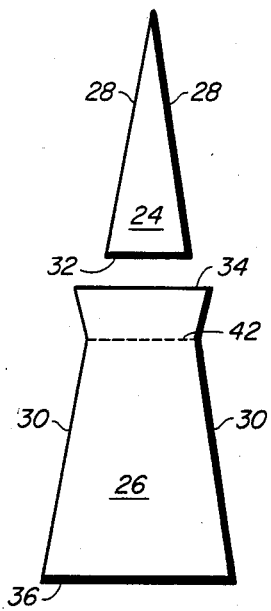

FIGS. 4A, 4B and 4C show various gore 22 configurations which will create a series of slits running around canopy 14. Each gore 22 is identical in a given parachute for ease of construction. FIGS. 4A, 4B, and 4C each show upper panel 24 as an isoceles triangle with equal sides 28 and a base represented by hem 32. In FIG. 4A, lower panel 26 is an isoceles trapezoid formed by parallel hems 34 and 36 and equal straight sides 30. These two panels may be made by cutting one large isoceles triangle of material and deleting the material otherwise between hems 32 and 34. In FIG. 4B and FIG. 4C, more elaborate cutting of lower panel 26 is required because sides 30 are shaped as if two separate geometric shapes were combined at dotted line 42. Line 42 is shown for purposes of explanation only and lower panel 26 is cut as a single piece to lessen the amount of stitching required. In FIG. 4C; lower panel 26 includes an isoceles trapezoid that is inverted with respect to the lower isoceles trapezoid section. These variations, plus others, permit a choice of the fullness ratio for slit 40 within gore design constraints.

Figure 5:
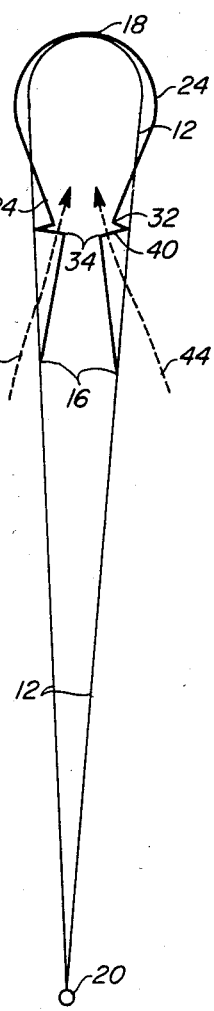
FIG. 5 shows the airflow relative to the invention during the early stage of the opening process.

FIG. 5 shows the airflow pattern during the opening sequence of the present invention. Remembering that the maximum opening shock occurs at FIG. 1C and not FIG. 1F, FIG. 5 shows the present invention at its first squid shape comparable to FIG. 1C. Slit 40 is located at the widest point of the inflated canopy at that point of the opening process. Immediately after line stretch and as the ball of air builds up in crown area 18, airflow is through slit 40 and into crown area 18 as shown by arrows 44. At this time, slit 40 is located below the ball of air. The natural tendency of slits 40 formed by hems 32 and 34 is to blow or form inwardly. Thus, airflow 44 is encouraged to flow into canopy 14 and encourages the expansion of the ball of air in crown area 18. This results from lower hem 34 of slit 40 being longer than upper hem 32 which causes lower panel 26 to form inwardly and funnel airflow into the inside of canopy 14. As a result, when crown area 18 fills, skirt 16 of lower panels 26 does not pop open as shown in FIG. 1C. The opening of skirt 16 is significantly slowed which results in less opening shock.

Figure 6:
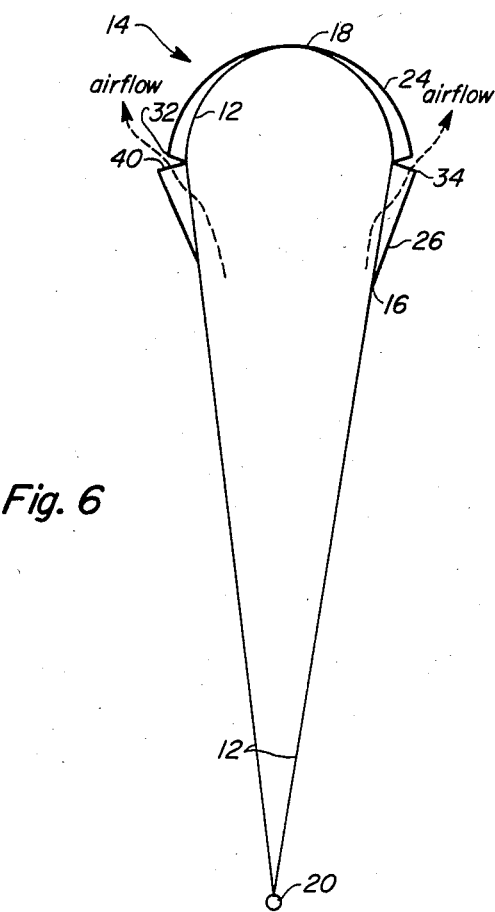
FIG. 6 shows the airflow relative to the present invention during the concluding stage of the opening process.

FIG. 6 shows the change in airflow when the ball of air grows until slits 40 are above the ball of air. The airflow now follows arrows 46. With hem 34 protruding further outward than hem 32, the airflow flows out of canopy 14 when skirt 16 starts to rapidly open, the time when opening forces will be at or near their highest point. Slit 40 has a compensating ability, it encourages inflation before maximum forces are reached and reduces the force at the proper time by allowing air to flow from canopy 14. This design both promotes positive opening and lowered opening shocks.

It is clear to those skilled in the art that numerous modifications to the above described parachute may be made.

What is claimed is:

1. In a circular parachute having a canopy with a conventional, inverted bowl shape with an apex opening and a plurality of suspension lines attached to said circular canopy about the circumference thereof for supporting a load therefrom, an improved canopy facilitating a soft opening action when deployed at high airspeeds, said canopy including:

a plurality of identical gores constructed of conventional parachute material, and each gore joined to adjacent gores to form said circular canopy, each gore characterized by being formed by an upper panel and a lower panel;

said upper panels joined to adjacent upper panels and being generally shaped as isoceles triangles extending from said apex opening to a predetermined point part way toward the attachment point of said suspension lines to an upper hem; and said lower panels completing each gore being joined to adjacent lower panels to form a skirt portion of said canopy having a lower hem adjacent to said upper hem, each of said lower panels being shaped and dimensioned such that said lower hem is longer in circumference than said upper hem, each of said lower panels being joined to said upper panels along said hem lines and at points where they are joined to adjacent panels such that the longer dimension of said lower hem is unattached between points of upper and lower panel junctions to form a cowl on each lower panel between points of attachment which collectively comprise an interupted circumferential vent extending about the canopy between the apex opening and the circumference where said suspension lines are attached, whereby said cowls are free to face inwardly under air pressure to fill said apex region during initial deployment and to face outwardly during final deployment to meet skirt air flow to effectively reduce opening shocks to a load attached to said suspension lines.

2. A controlled opening shock parachute as set forth in claim 1 where said lower panels are shaped as trapezoids.

3. A controlled opening shock parachute as set forth in claim 1, where said lower panels are shaped with a trapezoid section and a rectangle section joined thereto such that a side of said rectangle defines a portion of said lower hem.

4. A controlled opening shock parachute as set forth in claim 1, where said lower panels are shaped as two isoceles trapezoids joined along the shorter of the two parallel sides of each, such that the other parallel sides define said circumference of said canopy and the lower hem respectively.

* * * * *